United States Patent [19]

Kress et al.

[11] 4,076,445
[45] Feb. 28, 1978

[54] MULTIPLE BLADE REAMER

[75] Inventors: Dieter Kress, Aalen; Friedrich Häberle, Lauchheim, both of Germany

[73] Assignee: MAPAL Fabrik fur Prazisionswerkzeuge Dr. Kress KG, Aalen, Germany

[21] Appl. No.: 738,326

[22] Filed: Nov. 2, 1976

[30] Foreign Application Priority Data

Nov. 4, 1975 Germany .............................. 2549260

[51] Int. Cl.² .............................................. B23B 27/00
[52] U.S. Cl. ...................................... 408/226; 408/232
[58] Field of Search .............. 408/226, 227, 705, 199, 408/232, 81, 185, 181; 175/325, 408

[56] References Cited

U.S. PATENT DOCUMENTS

| 1,362,871 | 12/1920 | Kelly | 408/200 |
| 2,029,458 | 2/1936 | Berg | 408/181 |
| 2,303,487 | 12/1942 | Miller | 408/226 X |
| 2,977,829 | 4/1961 | Thoma | 408/181 |
| 3,191,463 | 6/1965 | Ladendorf | 408/200 X |

Primary Examiner—Gil Weidenfeld
Attorney, Agent, or Firm—Hans Berman

[57] ABSTRACT

In a reamer having two diametrically opposite, replaceable cutting blades on its cutter head, an axially elongated rib having a circumferential face approximately cylindrical about the axis of rotation is arranged in each of the two gaps circumferentially bounded by the cutting edges of the blades, thereby assuming the guide function of conventional multiple blades in the reamed hole, and permitting the blade edges to be provided with a relief angle of 5° or more.

8 Claims, 4 Drawing Figures

MULTIPLE BLADE REAMER

This invention relates to reamers, and particularly to an improvement in a known reamer in which several blades, circumferentially distributed about the axis of reamer rotation, radially project from the front end or cutter head of the reamer.

In known multiple-blade-reamers, the radially exposed, axial blade edges guide the reamer in the bore or hole in the workpiece. The known blades have approximately cylindrically arcuate lands for adequate guiding action, or they may have straight lands inclined at a very small relief angle to a tangent perpendicular to a radius drawn from the axis of rotation through the blade edge.

It is the primary function of the circumferentially distributed blade edges to remove very small and thin chips from the bore wall in order to improve the dimensional accuracy, precisely circular cross section, smoothness and cleanliness of the wall. The conventional cutting edge configurations constitute a compromise between the contradictory requirements for the guiding and smoothing functions. The unavoidable circumferential width of the lands in known reamer blades reduces the available maximum cutting rate.

It is the primary object of this invention to increase the permissible cutting speed of a multiple-blade reamer without impairing the smoothness of the bore wall, and actually to provide a bore of more precisely circular cross section at higher cutting rates than was available heretofore.

According to the invention, the smoothing and guiding functions of the conventional blades are distributed between blades shaped for best cutting performance and axially elongated guide ribs circumferentially interposed between adjacent cutting blades. With this arrangement, the reamer is precisely and stably guided in the bore while the wall surface of the bore is machined by the blades under conditions providing optimum conditions for this task independently of the guide function assumed by the ribs.

The guide ribs may have lands which are cylindrically arcuate substantially about the axis of reamer rotation and of any desired circumferential width, whereas the cutting blades may be ground to a very narrow land and a relief angle much greater than available heretofore, more specifically greater than 5°, for efficient and precise finishing of the bore wall.

It is sufficient to provide one guide rib in the gap between each pair of circumferentially successive cutting blades, approximately centered between the blades, but preferably slightly nearer the blade leading in the direction of reamer rotation which is defined by the cross sectional shape of the blades in a known manner. Reamers equipped with two blades benefit most from the guide ribs of the invention, but they improve the performance of reamers having three or more blades.

While a substantial improvement is achieved if the axial length of the guide ribs is approximately equal to that of the cutting edges on the ribs, and the ribs extend over approximately the entire length of the cutting edges circumferentially bounding the associated gap, higher machining speeds without loss in precision may be available if the interposed guide ribs extend axially beyond the blade edges toward the reamer shank. They may be supplemented by axially coextensive auxiliary guide ribs axially at least approximately aligned with one or all the cutting edges.

Other features, additional objects, and many of the attendant advantages of this invention will readily be appreciated as the same becomes better understood by reference to the following detailed description of a preferred embodiment when considered in connection with the appended drawing in which.

Figure 1:
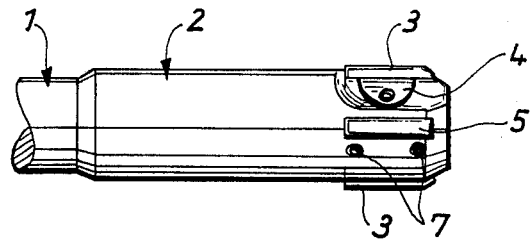
FIG. 1 shows a reamer of the invention in fragmentary side elevation.

Referring now to FIG. 1 in detail, there is shown the axial front end of a reamer shank 1, conventional in itself, which is integrally joined to an enlarged, basically cylindrical cutting head 2. Two axially elongated, reversible cutting blades 3 are set in diametrically opposite slots of the head 2 from which only the secondary cutting edges of the blades radially project. The blades are fixedly, but releasably, fastened to the head 2 by clamping jaws 4. The extent to which the secondary cutting edges project beyond the cylindrical head surface and the angle defined by each edge and the axis of rotation may be adjusted to some extent by set screws 7, as is known in itself and described in more detail in our simultaneously filed application Ser. No. 738,327, for a "Floating Reamer".

Figure 3:
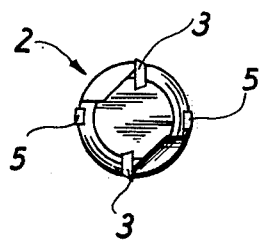
FIG. 3 is a front elevation of the reamer of FIG. 1.

As is best seen in FIG. 3, the secondary cutting edges of the blades 3 are diametrically opposite each other from the axis of reamer rotation, and two straight guide ribs 5 are approximately centered in the respective circumferential 180° gaps between the blades 3, but actually slightly nearer the leading blade, the direction of rotation of the reamer being counterclockwise, as viewed in FIG. 3. As is further evident from FIG. 3, each blade is ground to a sharp edge, that is, to a land of a width too small to permit pictorial representation on the scale of the drawing, and the relief angle is approximately 10°.

The guide ribs 5 radially project beyond the cylindrical face of the head 2 about as far as the cutting edges of the blades 3 and are parallel to the cylindrical head face over a circumferential width which is several times the width of the blade lands. The axial length of each rib 5 is practically identical with that of the cutting edge on a blade 3, and the front and rear ends of the cutting edges and of the ribs are located in respective common radial planes.

Figure 2:
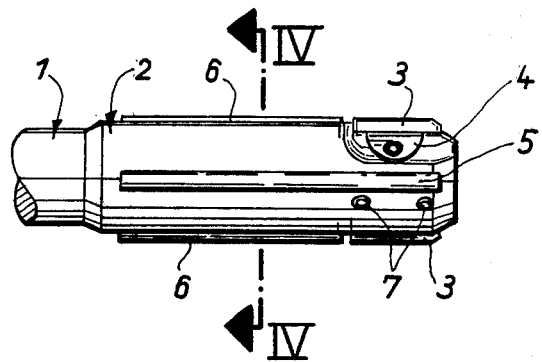
FIG. 2 illustrates a modification of the reamer of FIG. 1.
Figure 4:
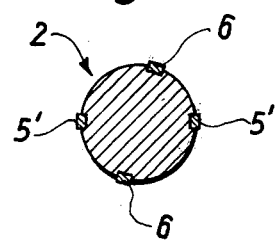
FIG. 4 shows the reamer of FIG. 2 in section on the line IV — IV.

In the modified reamer shown in FIGS. 2 and 4, two ribs 5' are arranged in the gaps between the two oppositely projecting cutting blades 3 as described with reference to FIGS. 1 and 3. However, the ribs 5' are almost four times as long as the associated blades 3, and project beyond the blades toward the shank 1, thereby supplementing the guiding effect provided by the shank 1 and an associated chuck, not shown. Auxiliary guide ribs 6, identical in cross section with the ribs 5, 5', are axially aligned with the two blades 3 in such a manner that their ends near the shank 1 are located in a common radial plane with the rear ends of the ribs 5' whereas the front ends of the latter are located in a common radial plane with the front ends of the blades 3.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A reamer comprising:
   (a) a shank defining an axis of rotation;
   (b) a cutter head secured to one axially terminal portion of said shank;
   (c) a plurality of cutting blades mounted on said cutter head,
      (1) each cutting blade having a cutting edge elongated in the direction of said axis and radially projecting from said cutter head,
      (2) said cutting edges being circumferentially distributed on said cutter head,
      (3) each cutting edge defining two gaps extending from the cutting edge in opposite circumferential directions to another cutting edge;
   (d) an axially elongated guide rib projecting from said cutter head in each of said gaps and being approximately centered circumferentially in the associated gap between the cutting edges defining said gap.

2. A reamer as set forth in claim 1, wherein each of said cutting edges has a peripheral, axially elongated face defining a relief angle of at least 5° with a tangent drawn on a cylinder about said axis.

3. A reamer as set forth in claim 2, wherein said plurality of cutting edges includes two blades having respective cutting edges diametrically opposite each other relative to said axis.

4. A reamer as set forth in claim 1, further comprising adjusting means for varying the radial spacing of each cutting edge from said cutter head.

5. A reamer comprising:
   (a) a shank defining an axis of rotation;
   (b) a cutter head secured to one axially terminal portion of said shank;
   (c) a plurality of cutting blades mounted on said cutter head,
      (1) each cutting blade having a cutting edge elongated in the direction of said axis and radially projecting from said cutter head,
      (2) said cutting edges being circumferentially distributed on said cutter head,
      (3) each cutting edge defining two gaps extending from the cutting edge in opposite circumferential directions to another cutting edge;
   (d) an axially elongated guide rib projecting from said cutter head in each of said gaps; and
   (e) an auxiliary guide rib axially approximately aligned with at least one of said cutting edges,
      (1) said auxiliary guide rib being axially elongated and extending from said at least one cutting edge in a direction from said cutter head toward said shank.

6. A reamer as set forth in claim 5, wherein said cutting edges are shaped to define a direction of reamer rotation about said axis, whereby the two cutting edges defining each gap constitute a leading cutting edge and a trailing cutting edge in said direction of rotation, the guide rib projecting from said gap being circumferentially nearer the leading cutting edge than the trailing cutting edge.

7. A reamer as set forth in claim 5, wherein each of said guide ribs extends axially over approximately the entire axial length of the cutting edges circumferentially bounding the associated gap, and further extends axially beyond and associated cutting edges in a direction from said cutter head toward said shank.

8. A reamer as set forth in claim 7, further comprising adjusting means for varying the radial spacing of each cutting edge from said cutter head.

* * * * *